UNITED STATES PATENT OFFICE.

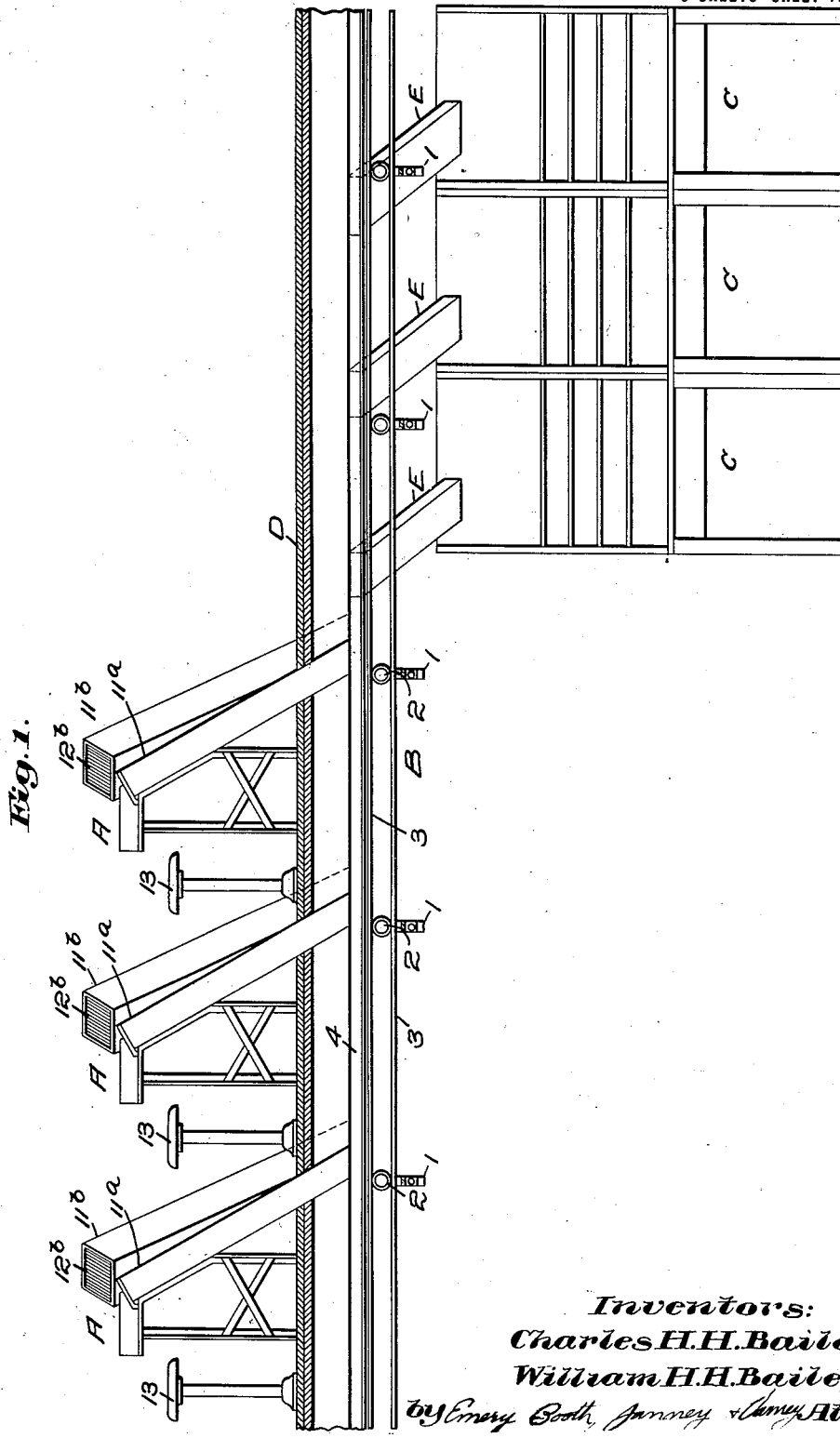

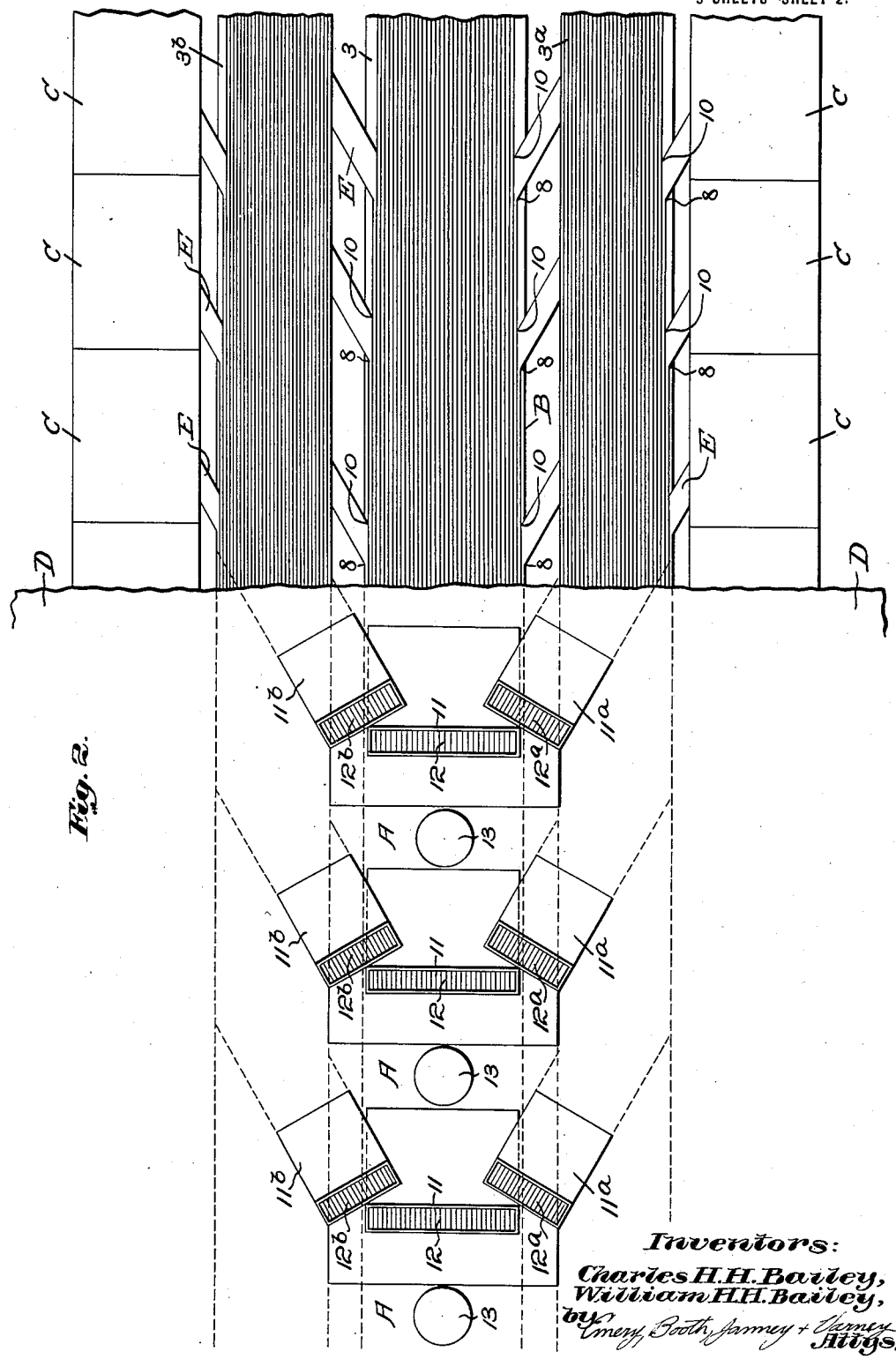

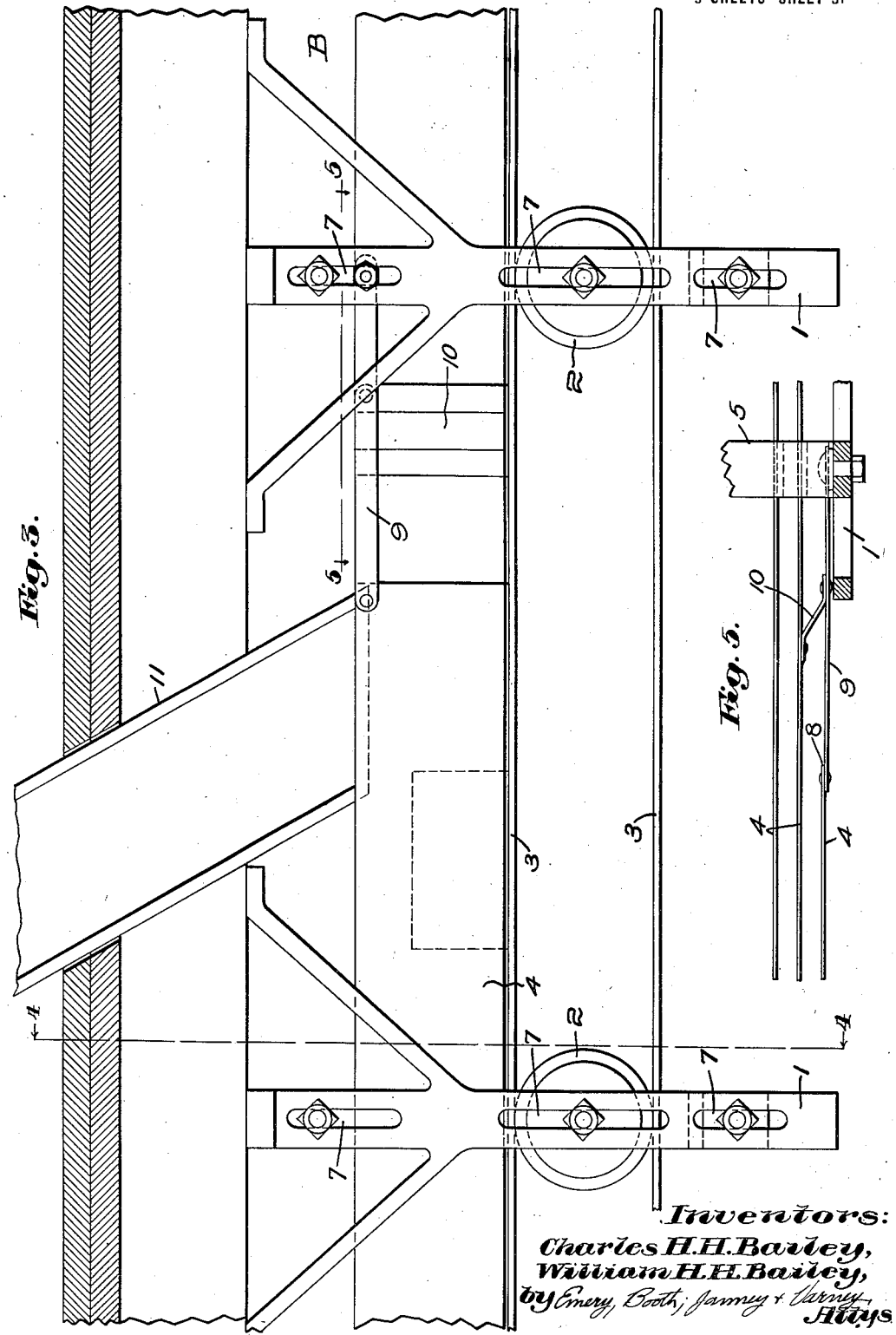

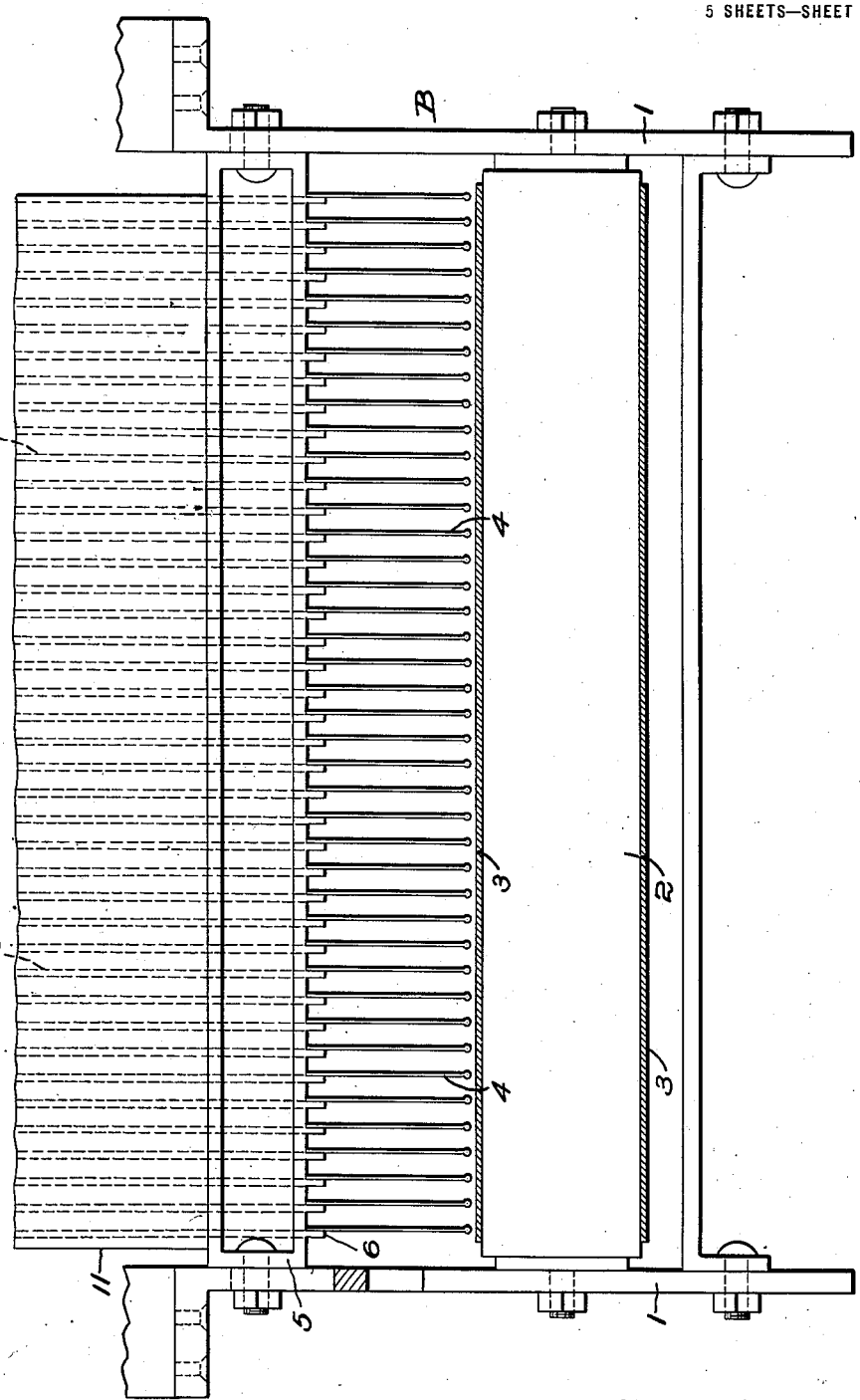

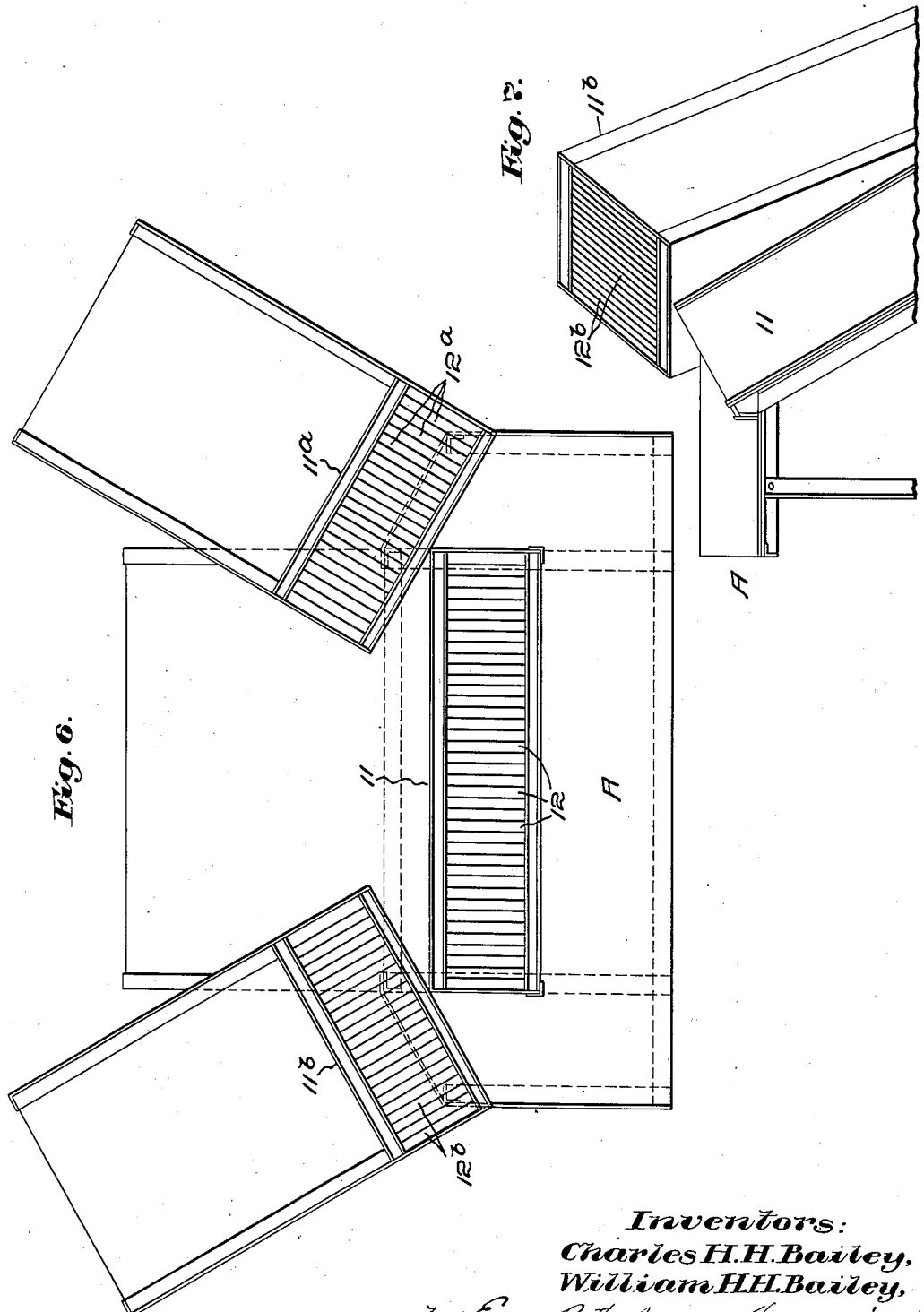

CHARLES H. H. BAILEY AND WILLIAM H. H. BAILEY, OF BRAINTREE, MASSACHUSETTS.

DISTRIBUTING-MACHINE.

1,219,067.  Specification of Letters Patent.  Patented Mar. 13, 1917.

Application filed December 16, 1915. Serial No. 67,111.

*To all whom it may concern:*

Be it known that we, CHARLES H. H. BAILEY and WILLIAM H. H. BAILEY, citizens of the United States, and residents of Braintree, in the county of Norfolk and State of Massachusetts, have invented an Improvement in Distributing-Machines, of which the following description, in connection with the accompanying drawings, is a specification, like characters on the drawings representing like parts.

This invention relates to distributing machines, that is, to machines which are adapted to deliver articles according to some predetermined choice or classification. In the embodiment of the invention herein described the machine is also an assorting machine in that the articles require no preliminary assorting or classification before being fed to the machine.

Our invention will be best understood by reference to the following description taken in connection with the accompanying drawings, wherein we have shown as an illustrative embodiment of our invention a system or apparatus designed for sorting and distributing letters in post offices.

In these drawings,—

Figure 1 is a semi-diagrammatic view showing one form of our improved apparatus in sectional elevation;

Fig. 2 is a similar view in plan partly broken away;

Fig. 3 is a side elevation of a portion of the conveyer mechanism;

Fig. 4 is a section on the line 4—4 of Fig. 3;

Fig. 5 is a section on the line 5—5 of Fig. 3 on an enlarged scale;

Fig. 6 is a plan of a station from which the work is fed to the apparatus; and

Fig. 7 is a sectional elevation of the same.

The installation which is illustrated in Figs. 1 and 2 of the drawing is a comparatively elaborate one and those parts which are denoted by reference numerals modified by letters are, while not mere duplicates, similar in function to the parts denoted by the numerals alone. For clearness in description, we will in the first instance describe the apparatus without reference to the first mentioned parts and afterward explain their place in the machine.

The general arrangement of the apparatus which we have chosen as an example of our invention can be best understood from Figs. 1 and 2 in which A, A, A are assorting stations at which the articles, in this case letters, are fed to the mechanism B, by which the articles are received and carried along in a segregated or classified condition, and C, C, C are receiving stations to which the various classes of articles are respectively delivered. Our invention is, of course, applicable to many uses but for clearness we will describe an embodiment adapted for use in post offices and in this case the stations A, A, A would be assorters' desks and the stations C, C, C carriers' desks. In the embodiment shown the assorters' desks are placed on an upper or mezzanine floor D beneath which the conveying apparatus B is suspended and the carriers' desks C, C are on the floor below whereby a constant gravity feed is provided for and an economy effected in the use of floor space.

Referring now to Figs. 3, 4 and 5 which show in detail the conveyer apparatus B which distributes the articles, it will be seen that we have provided the brackets 1 suspended from the floor D referred to and carrying the rollers 2. These rollers support the belt conveyer 3 which is driven over them by any suitable means. The surface of the conveyer 3 is, as it were, divided into separate zones in such a manner that articles delivered to one zone cannot be mixed in any way with those in another zone, but are segregated from the rest. This division may be accomplished in any suitable manner but we prefer to provide upstanding walls or partitions 4 which extend in spaced relation longitudinally of the belt.

These walls, which separate the various classes of articles on the conveyer and guide them in their traveling movement may be supported above the conveyer and in the embodiment shown are stationary.

Preferably we support the walls on hangers 5 extending between the roller supporting brackets 1 and furnished with the lugs 6. The wall members 4 are fastened to the lugs 6 and provide a plurality of narrow passages extending along the conveyer. These wall members 4 may be of any suitable construction but we have here shown them (see Fig. 4) as made of suitable sheet metal which is desirably beaded at the edge nearest the conveyer. It will further be understood that although we have referred to these members as walls that they need not necessarily be continuous or imperforate, it being necessary only to construct them in such a way that they will effectually prevent the transfer of the articles carried from one zone of the conveyer to another and will act as guides for the articles. Preferably the brackets 1 are slotted as shown at 7 so that the rollers 2 and hangers 5 may be adjusted as may be found necessary.

Means are provided whereby the articles traveling on a given zone of the conveyer, that is, articles of a given class, may be checked in their traveling movement and diverted from the conveyer without disturbing the other articles. This means is shown diagrammatically in Fig. 2 and in detail in Figs. 3 and 5. Adjacent the delivery station C at which it is desired to deliver the articles of a given class, one of the walls 4 defining the passage-way through which articles of that class travel is cut away as shown at 8, the free end of the wall being here shown supported from a hanger lug 6 by a strap 9. The opposite wall of the passage is deflected or, as shown, a separate element is arranged to intersect it to provide an article-diverting wall 10 which extends diagonally across the line of motion of the articles on the carrier and extends to or beyond the opening formed by the cut-away portion 8. It will be apparent that a letter or other article moving along the passageway on the conveyer 3 will be checked in its movement by the diagonal wall 10 and diverted toward the side of the conveyer and thus fed off from the same and to the delivery station or carrier's desk C, in the embodiment shown through suitable chutes E. By a proper arrangement of the diverting walls classes of articles traveling on zones of the conveyer may always be delivered each to the same point.

We shall next describe the means provided whereby articles can be fed from an unclassified bulk directly to the proper zones on the conveyer 3. For this purpose there is provided chute 11 (Fig. 1) which extends from station A to the conveyer 3. This so-called chute is in reality a set or bank of individual chutes 12 as shown most clearly in Figs. 2 and 4, each one of the individual passages or chutes 12 of the bank leading to a separate one of the spaces between the guide walls 4 above the conveyer 3. In other words, each of the individual passages supplies a given zone of the conveyer. It will be noted that the station A is directly above the conveyer 3 and that the chutes extend downward toward it in the direction of its movement. This arrangement is of considerable advantage since it makes possible the use of a wide belt with a large number of zones thereon, all of which may be conveniently reached by one operator at the station. Furthermore, in the case of letters the delivery thereof to the belt in the direction of its movement facilitates the operation of the device and assures that the letter will be carried along in the same position it had when fed into the chute without being tipped or turned in its passage to the conveyer or by the action of the belt. Therefore, the letters are all delivered "faced up," that is, all arranged in the same way as respects their addressed sides and are, therefore, much more readily handled.

It will be apparent that the operator, in the example a mail assorter, may sit on the seat 13 at the station A and feed letters from a bundle in his hand directly to the proper passage 12 which will deliver them to a zone of the conveyer from which they will be discharged at the desk C of the carrier who should deliver the letters on his route. In other words, the assorter is continually classifying the mail and as fast as he does so it is delivered in the classified condition directly to the points where it is next handled. Of course, any desired number of operators may work to feed the conveyer 3, three stations being here illustrated, and it will be obvious that all these operators will feed the mail directly to the proper zones of the belt without interfering one with the other and that the apparatus will assemble or bring together all letters of a given class by whatever operators separated.

In the installation shown in Figs. 1 and 2 there are provided three conveyer belts 3, 3$^a$ and 3$^b$, the latter two being disposed at either side of the central belt 3. To enable the assorter to more readily feed a number of belts we have provided an improved arrangement of assorting station illustrated more particularly in Figs. 6 and 7. In the embodiment shown the assorting station is disposed substantially vertically above the central belt and extended before the operator are the intake ends of the subdivisions 12 of the chute 11 extending in a substantially horizontal bank which might be compared to the keys of a piano manual. It will be apparent that an operator can only tend a comparatively short length of bank such as described and that he is also limited as to his movements in the vertical direction. Furthermore, it is desirable to eliminate as far as possible movements involving lifting of the arm to a considerable height as they are time-consuming and fatiguing. To provide a means whereby a single operator can take care of a comparatively great number of individual chutes, we have devised the arrangement herein shown. The passageways of the chutes 11$^a$ and 11$^b$ leading to the lateral belts 3$^a$ and 3$^b$, respectively, are located in separate banks. These banks are disposed diagonally across the ends of the main bank of the chute 11 and are preferably somewhat elevated thereover. The operator seated before the chute 11 can easily sort the articles from a bunch in his hand to the individual passages of the chute 11 directly before him. It is also comparatively easy for him to reach to the diagonally disposed banks of article receiving passages 12ª and 12ᵇ of the chutes 11ª and 11ᵇ since they, as it were, are disposed on the arc of which his arm is the radius and since they are slightly elevated about the main bank of article receiving passages the latter does not interfere.

We have illustrated in the accompanying drawing and described in this specification one particular embodiment of our invention and one designed for a special use and for the sake of clearness we have described this device in considerable detail using specific words pertinent to the particular application of the invention. It will be understood, however, that the embodiment and the application shown are to be considered as illustrative merely and that the words used were used with reference thereto in a descriptive or identifying and not in a limiting or defining sense.

What we claim and desire to secure by Letters Patent is:

1. A distributing machine comprising a belt conveyer, a plurality of partitions above the same dividing its surface in article segregating zones and an assorting station located above the conveyer, said station having accommodation for an operative to work with the conveyer beneath him whereby he may face longitudinally of the same and feed to the same at either hand, and having chutes extending therefrom longitudinally of the conveyer and opening to the individual zones whereby to deliver articles to the conveyer in substantially its direction of movement.

2. An apparatus of the class described comprising, in combination, pairs of suspension brackets adapted to be secured to a ceiling, rollers carried by said brackets, a belt trained over said rollers, hangers carried by said brackets above the belt and having alining flanges and longitudinal wall members secured to said flanges and suspended above the belt.

3. An apparatus of the class described comprising, in combination, conveyers arranged beside one another, a station from which to feed articles to said conveyers arranged above one of them and chutes leading from said station to the conveyers, the intake end of the chute leading to the laterally disposed conveyer being arranged diagonally at the side of the other.

4. An apparatus of the class described comprising, in combination, conveyers arranged beside one another, a station from which to feed articles to said conveyers arranged above one of them and chutes leading from said station to the conveyers, the intake end of the chute leading to the laterally disposed conveyer being arranged diagonally at the side of the other and higher than the same.

5. An apparatus of the class described comprising, in combination, conveyers arranged one beside the other, means to divide said conveyers into article segregating zones, a station from which to feed articles to said conveyer arranged above one of them, a set of chutes leading from said station to each of the conveyers and providing means whereby an article may be fed to any zone, the intake end of the set of chutes leading to the laterally disposed conveyer being arranged diagonally at the side of the other.

6. An assorting and distributing installation comprising a belt conveyer and means dividing its surface in article segregating zones, a plurality of distributing stations located above and in alinement with said conveyer, each station providing accommodation for an operative to work with the conveyer beneath him whereby he may face longitudinally of the same and feed to the same at either hand, chutes leading from each distributing station and feeding directly by gravity to the several zones of the conveyer and receiving stations to receive the articles from the zones.

7. A distributing installation comprising a supporting floor, assorting stations set thereon and providing for the accommodation of operatives, a belt conveyer hung beneath said floor and extending beneath said stations, means dividing the surface of said conveyer into article-segregating zones, chutes leading from said stations to said several zones, and discharging chutes leading from said zones to a level below said floor.

In testimony whereof, we have signed our names to this specification.

CHARLES H. H. BAILEY.
WILLIAM H. H. BAILEY.

Witnesses:
GEORGE C. WESTON,
JAS. J. JACOBS,
JOHN W. BOWDREN.